United States Patent [19]

Blose

[11] Patent Number: 4,741,289

[45] Date of Patent: May 3, 1988

[54] DOG SHOWER

[76] Inventor: Terry M. Blose, R.D. #2 Mayport, Box 158A,, Timlin, Pa. 16240

[21] Appl. No.: 889,096

[22] Filed: Jul. 23, 1986

[51] Int. Cl.⁴ .............................................. A01K 13/00
[52] U.S. Cl. ................................... 119/158; 119/159; 4/567
[58] Field of Search ............... 119/158, 159, 1; 4/567, 4/568, 569 X, 510, 601, 615 X, 616, 617, 608

[56] References Cited

U.S. PATENT DOCUMENTS

| | | | |
|---|---|---|---|
| 475,754 | 5/1892 | Clifford et al. | 4/567 |
| 819,582 | 5/1906 | Newton | 4/567 |
| 870,766 | 11/1907 | Eaton | 119/159 |
| 1,879,915 | 9/1932 | Smoot | |
| 2,264,201 | 11/1941 | Findlay | 119/159 |
| 3,163,149 | 12/1964 | Ivey | 119/158 X |
| 3,248,741 | 5/1966 | Stout et al. | 4/148 |
| 3,496,914 | 2/1970 | Cowan | 119/159 |
| 3,793,987 | 2/1974 | Rogers | 119/1 |
| 3,867,906 | 2/1975 | Johnson | 119/158 |
| 4,020,796 | 5/1977 | Grita | 119/158 |
| 4,056,078 | 11/1977 | Blafford et al. | 119/158 |
| 4,057,032 | 11/1977 | Dimitriadis | 119/1 |
| 4,236,489 | 12/1980 | Carra | 119/158 |
| 4,425,672 | 1/1984 | Johnson et al. | 4/596 |
| 4,545,083 | 10/1985 | Searson | 4/615 |
| 4,563,780 | 1/1986 | Pollack | 4/192 |

Primary Examiner—Henry E. Raduazo
Assistant Examiner—Creighton Smith
Attorney, Agent, or Firm—Buell, Ziesenheim, Beck & Alstadt

[57] ABSTRACT

A portable dog shower apparatus is disclosed. Independent side spray grid members are removably attached to opposite sides of a shallow fiberglass base. An additional top spray grid is removably connected on top of the side grids and plural spaced-apart spray tubes within each grid provide a large spray area for washing and rinsing a dog or other domestic animal. Each of the side and top spray grids are formed from PVC piping thereby making the entire apparatus lightweight and easily transportable. Each spray grid provides a complete spray coverage of a large area and because separate spray grids are provided both above and on each side of the animal, the showering process is simplified and shortened.

7 Claims, 3 Drawing Sheets

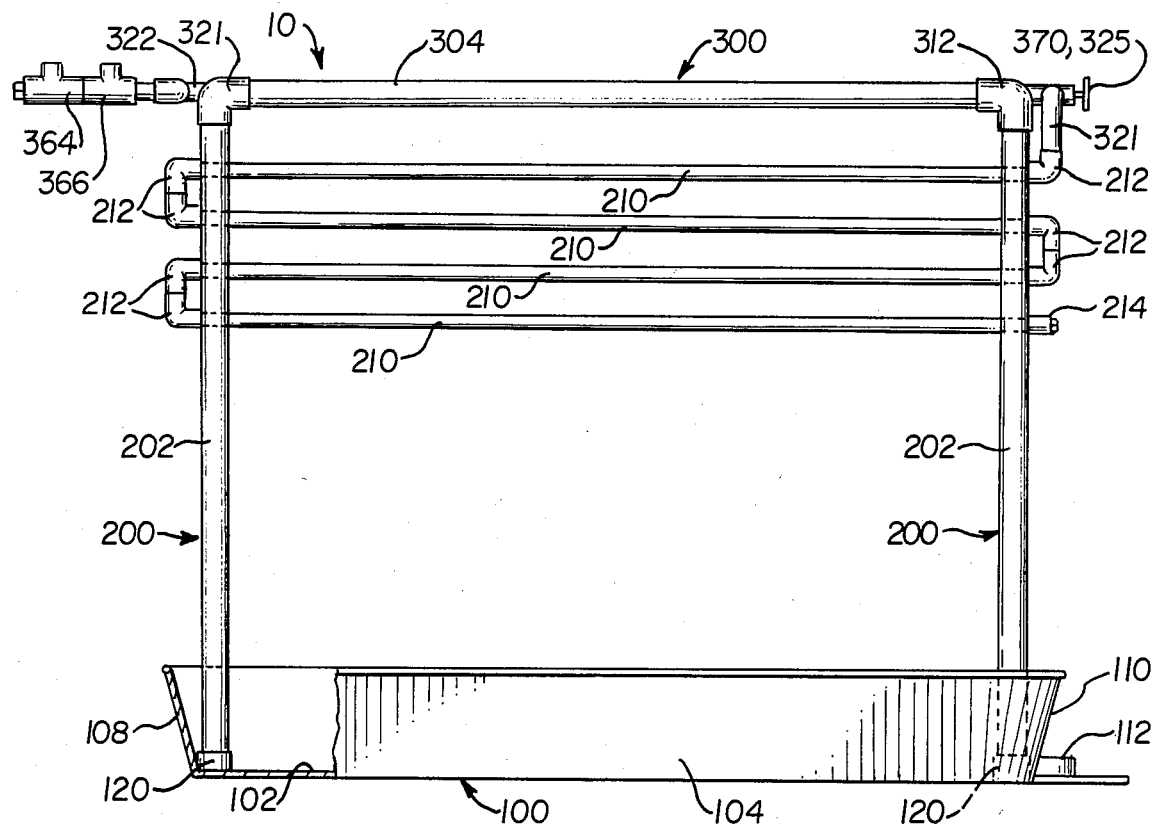
FIG. 1
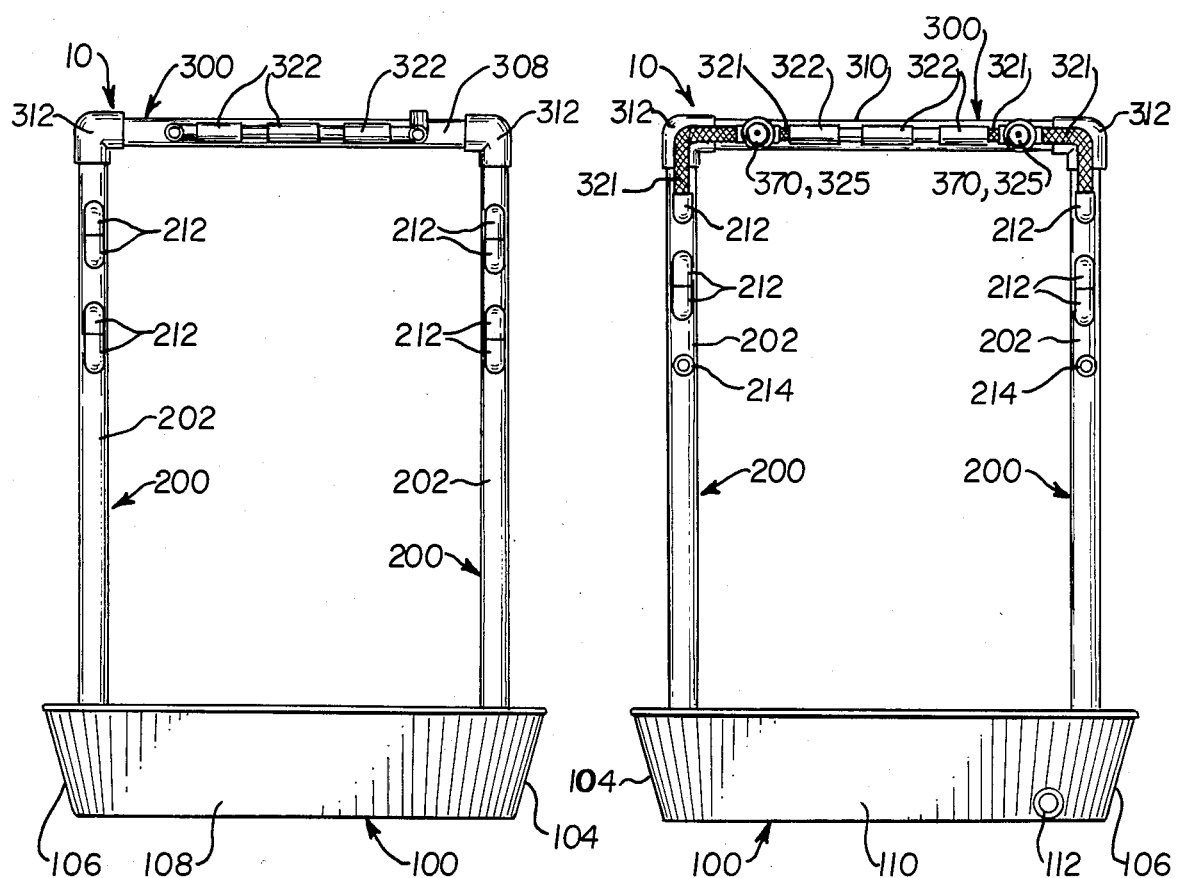
FIG. 3
FIG. 4

DOG SHOWER

BACKGROUND OF THE INVENTION

1. Field of the Invention

This invention relates to a dog shower apparatus. More specifically, it relates to a portable dog shower in which three, independent, removably interconnected spray grids are utilized in combination with a tub-like base to provide complete water spray coverage of a dog from above and from two sides.

2. Description of the Prior Art

Various forms of dog showers have been proposed in the past. For example, U.S. Pat. No. 1,879,915 discloses a portable dog shower in which a singular rectangular cross-section main spray tube having perforations on each side is supported above a tub base to provide a spray of water downwardly on an animal secured within the device. This patent also provides a supplemental spray pipe having perforations therein to provide detergent. The supplemental spray pipe is also provided only directly above the animal. This patent, however, teaches the use of only a single water spray pipe located centrally above the animal and therefore does not provide complete spray coverage. Further, this apparatus requires the provision of a separate spray pipe to provide detergent.

U.S. Pat. No. 4,057,032 discloses another animal bathing apparatus which includes a vertically adjustable frame which supports a single horizontal spray pipe having holes therein. This patent teaches that additional holes may be provided in vertical strut members to provide additional spray. However, such a device would still be ineffective in providing complete coverage over side portions of a large dog.

None of the known existing animal showers provide a water spray arrangement which allows for complete, simultaneous coverage of the dog being showered. Accordingly, with existing devices, the time necessary to complete a showering operation is unnecessarily long.

SUMMARY OF THE INVENTION

The present invention overcomes the inadequate spray coverage problem found in existing dog showers by providing three, independent, removably interconnected spray grid members supported in a tub-like base. The spray grids are preferably formed of polyvinyl chloride (PVC) pipe sections and connectors. The base is preferably in the form of a shallow fiberglass tub and has a bottom portion and upwardly depending walls extending around a perimeter thereof. The bottom wall preferably slopes downwardly toward an end wall in which a drainpipe is provided. A hose may be attached to the drainpipe to facilitate draining. Tube receiving means are provided in corner portions of the tub.

The present invention includes two side spray grid means. Each side spray grid has a vertically oriented tubular support member at each end adapted to be removably inserted into a tube receiving means preferably in the form of a cap mounted in the corner portions of the base. Each side grid has plural, longitudinally extending parallel spray tubes supported between the vertical supports with the tubes interconnected in a manner to provide a single continuous passageway. Each of the spray tubes have a plurality of spray openings at spaced intervals along its length. When inserted in the tube receiving means, the side grids are supported in substantially vertical planes on opposite sides of the base. The spray tubes of each side grid in assembled position are vertically spaced from one another and extend substantially horizontally. The sprays openings of the side grid tubes are directed generally toward an opposite side grid.

A top grid is removably supported on the side grids. The top grid has a generally rectangular tubular frame, water input means, and a plurality of interconnected longitudinally extending parallel tubes which are connected to said water input means. The tubes of the top grid each also have a plurality of spray openings at spaced intervals along their length and a connection means is provided for interconnecting the spray tubes of the top grid to those of the side grids. The top grid is adapted to be removably supported in a substantially horizontal plane on upper ends of the vertical support frames members by additional tube receiving means provided on the rectangular frame. The openings in the top grid tubes are provided on lower portions thereof so that they provide a downwardly directed spray of water.

In a preferred embodiment of the invention, the input means includes both soap input means and conditioner input means. Further, the preferred water input means comprises a main inlet tube and a "Y" connector with each leg of said "Y" connector connected to a separate spray tube of the top grid means.

The connection means for interconnecting the top and the side grids preferably comprises two separate hoses each of which is provided with a separate shutoff valve for selectively providing water to either the top grid alone or to both the top and side grids.

Additional shutoff valves are provided in each leg of the "Y" connector of the water connector means. Finally, suitable strap means are secured to the rectangular frame of the top grid near the corners thereof to aid in restraining a dog or other animal in a desired position within the shower apparatus.

Various other advantages and features of the present invention will be more fully understood on reference to the presently preferred embodiments thereof and to the appended drawings.

BRIEF DESCRIPTION OF THE DRAWINGS

FIG. 1 is a side elevational view of a dog shower apparatus according to the present invention.

FIG. 3 is a front elevational view of the dog shower apparatus of FIG. 1.

FIG. 4 is a rear elevational view of the dog shower apparatus of FIG. 1.

DETAILED DESCRIPTION OF THE PREFERRED EMBODIMENTS

Figure 2:
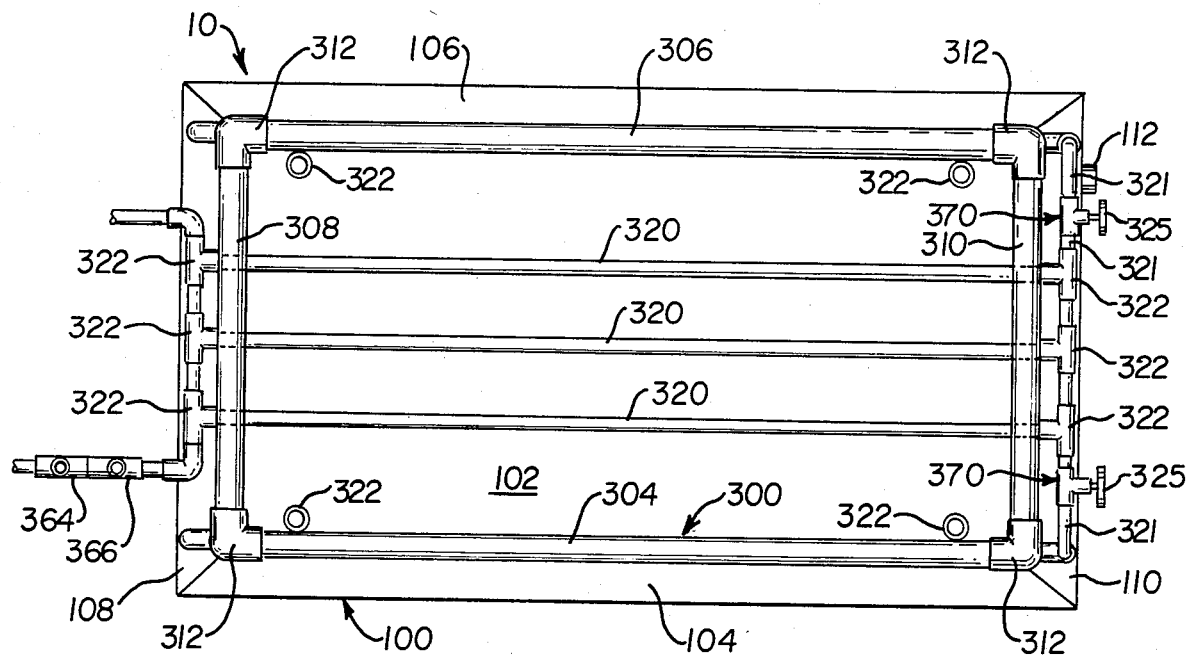
FIG. 2 is a top plan view of the dog shower apparatus of FIG. 1.
Figure 5:
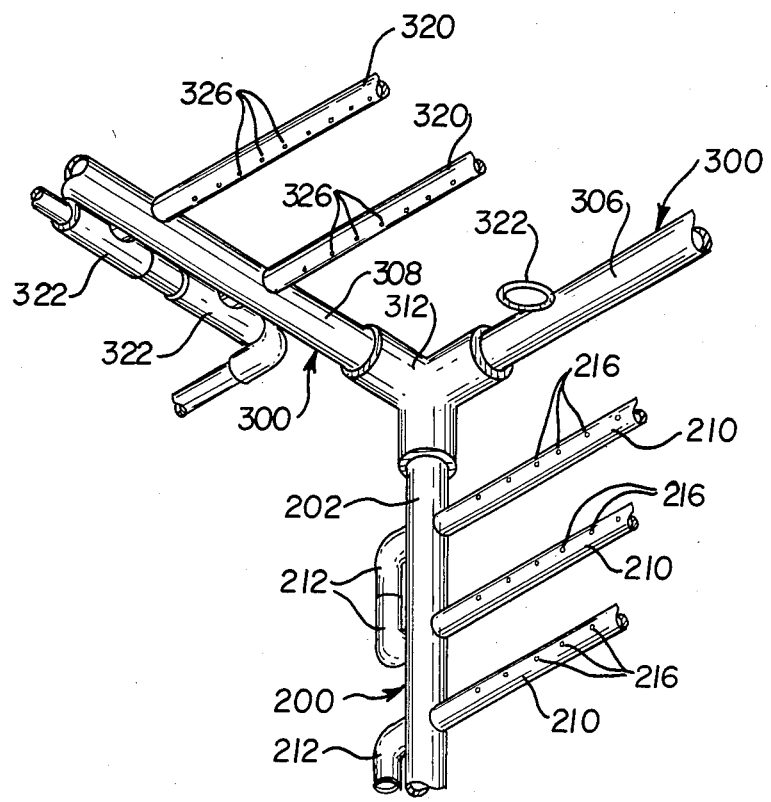
FIG. 5 is a fragmentary isometric view showing a corner portion of dog shower apparatus of FIG. 1.

The present invention, as described herein, will be referred to as a dog shower apparatus. It will be understood by those skilled in the art, however, that it may also be used for showering various other types of domestic animals.

Referring specifically to FIGS. 1 through 5, the dog shower apparatus 10 of the present invention includes four major components. These components include a base 100, a pair of side spray grids 200 and a top spray grid 300.

Base 100 is in the form of a shallow rectangular tub and is preferably fabricated from a high-strength lightweight material such as fiberglass. Base 100 includes a bottom portion 102 and upwardly depending walls 104, 106, 108 and 110. Preferably the bottom 102 of base 100 slopes downwardly toward one end, such as end portion 110, in which a suitable drainpipe 112 is provided. A hose (not shown) may be attached to drainpipe 112 to facilitate draining of base 100. A tube receiving means preferably in the form of caps 120 is preferably attached to bottom portion 102 of base 100 at the four corners of the base formed by wall members 104, 106, 108 and 110.

Two side spray grids each designated 200 are provided. The two side grids 200 are a mirror image of one another and include the same components. Each spray grid 200 includes a tubular vertical support member 202 at each end and has a plurality of longitudinally extending parallel tubes 210 supported between the vertical supports 202. Vertical support members 202 are preferably fabricated from PVC pipe sections having a nominal one and one-half inch diameter. Spray tube members 210 are also formed of PVC pipe and preferably have a nominal one-half inch diameter. Opposite ends of spray tubes 210 extend through openings provided in the vertical support members 202. Spray tubes 210, preferably four of which are included in each side spray grid, are interconnected by suitable connectors such as elbows 212 to form a single continuous passageway through all spray tubes 210 of the side spray grid 200. A suitable plastic plug member 214 is provided on a free end of the lowermost spray tube 210 as best shown in FIG. 1. Each spray tube 210 has a plurality of spray openings 216 at spaced intervals along its length. Each opening 216 has a diameter of approximately one thirty-second inch and approximately forty-three such openings are provided in each spray tube 210.

The lower end of support tubes 202 of side spray girds 200 are adapted to be removably supported by tube receiving means 120 of base 100. In its assembled position, each side spray grid 200 is supported in a substantially vertical plane on opposite sides of base 100. Spray tubes 210 each extend horizontally and are vertically spaced from one another as shown in FIG. 1. In assembled form, spray openings 216 face inwardly so as to direct a water spray generally towards an opposite side grid.

The top spray grid means includes a generally rectangular tubular frame comprised of end members 308 and 310 and side members 304 and 306. The frame side members and end members are connected together by suitable three-way side opening elbows 312 to form a rectangular frame. Frame members 304, 306, 308 and 310 and also preferably formed from one and one-half inch diameter PVC pipe. It is noted that suitable stainless steel eyebolts 322 may be provided through upper frame members 304 and 306 at either end thereof to provide a suitable means to connect securing straps or chains (not shown) utilized to restrain the dog or animal in a desired position during a showering operation. A plurality of longitudinally extending spray tubes 320 (preferably three) extend parallel to frame members 304 and 306 are supported at each end through openings provided in end frame members 308 and 310. Spray tubes 320 are interconnected at each end by suitable "T" connectors 322. Each spray tube 320 also includes a plurality of spray openings 326 at spaced intervals along its length.

Top spray grid means 300 also includes a water input means designated generally as 350 and a connection means 370 for interconnecting spray tubes 320 of upper spray grid 300 to spray tubes 216 of side spray grids 200. Top spray gird 300 is adapted to be removably supported in a substantially horizontal plane on upper ends of vertical support frame members 202 of side grids 200 by additional tube receiving means which preferably comprise the side opening tubes of three-way side opening elbows 312. In its assembled form, spray openings 326 open downwardly toward base 100.

Water inlet means 350 (FIG. 6) preferably includes a main inlet pipe 352 connected to a "Y" connector 354 having leg portions 356 and 358. A timer 353 may be provided in main line 362. A shutoff valve 360 and a check valve 361 are preferably connected to each of legs 356 and 358 of "Y" member 354. A suitable connecting line 362 directly connects leg 358 of "Y" connector 354 to an interconnecting "T" member 322 of upper grid spray tubes 320. The opposite leg 356 of "Y" connector 354 is also connected to a connecting "T" member 322 of upper grid tubes 320 but has a soap input means 364 and a conditioner input means 366 provided in such connecting line 368. Soap input means 364 and conditioner input means 366 are preferably in the form of regulator devices which each have a suitable connecting hose 365 connected to a supply of soap 367 and conditioner 369, respectively. A suitable holder 371 for the soap and/or conditioner supply may be conveniently attached to a vertical support member 202 of one of the side spray grids 200. A "Y" type water input means is preferred because the soap input and conditioner input regulators each restrict the flow of water through one leg of the water input means. The other leg, extending from leg portion 358 is completely unobstructed and provides a convenient means to flush the system with a maximum water pressure.

The connection means 370 for interconnecting spray tubes 320 of the upper spray grid to spray tubes 212 of the side spray grids are preferably in the form of two flexible clear plastic tubes, each designated 321. A suitable shutoff valve 325 is provided in each connection line between the spray tubes, each side grid and the top grid spray tubes.

One of the useful features of the present invention is that it may be easily assembled and disassembled making it extremely portable. Because the entire dog shower is fabricated from lightweight high-strength materials, such as fiberglass and PVC piping, the entire weight of the system is reduced making it easily transportable. To assemble the dog shower apparatus the base 100 is first positioned on a relatively flat surface. Next, the vertical support tubes 202 of each side grid are inserted into the tube receiving means 120 in the corners of the tub base 100. Then the top spray grid 300 is placed on the top ends of the vertical support members 202 of the side spray grids. Finally, tubing members 321 are attached from the top spray grid tubes to the side spray grid tubes and the main supply tube 352 of the water input means 350 is provided with a source of temperature controlled water.

Figure 6:
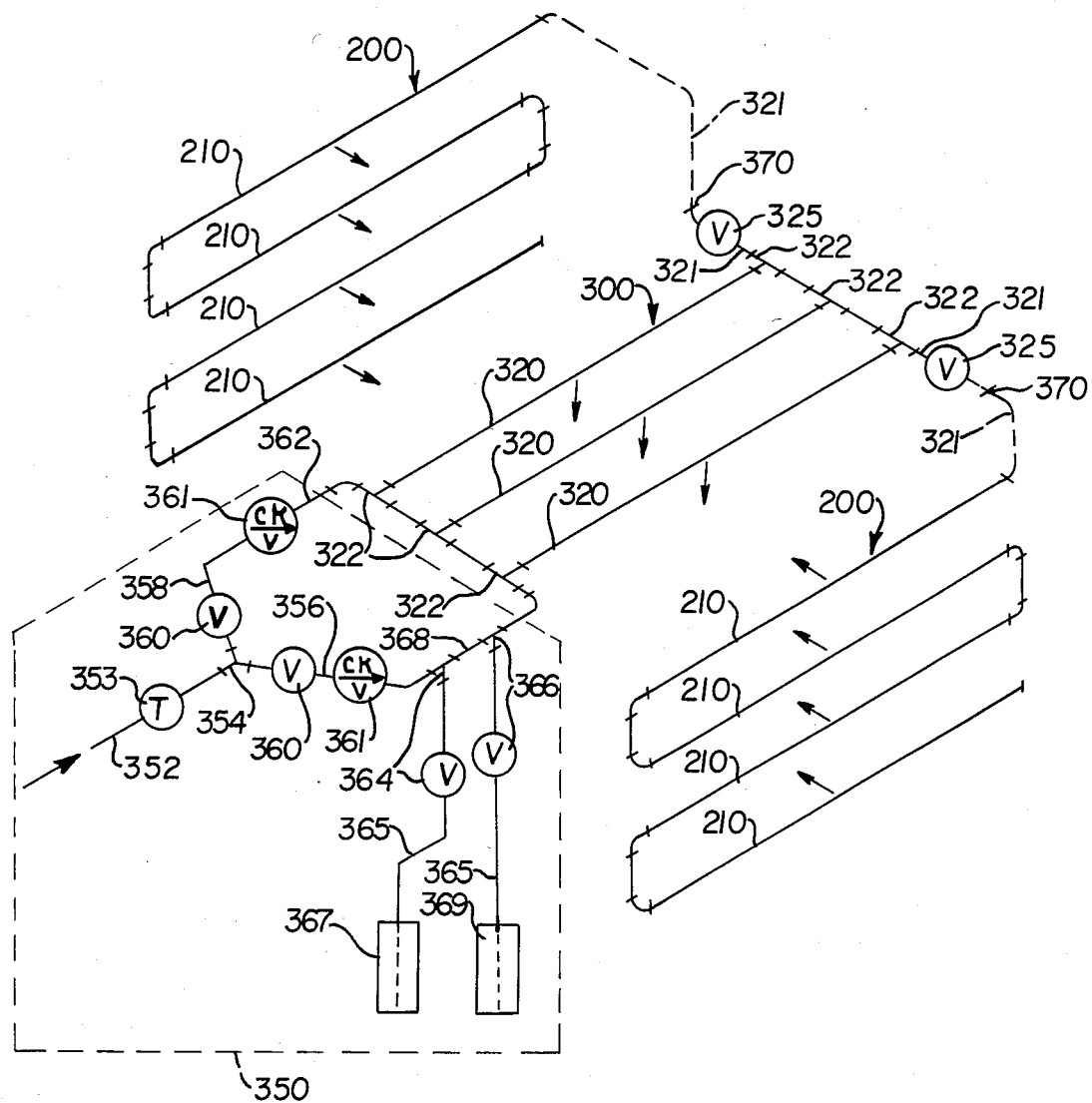
FIG. 6 is a schematic diagram showing the operation of the dog shower of the present invention.

Referring to FIG. 6, in use, shutoff valves 325 connecting the upper spray grid tubes with the side spray grid tubes are turned to a closed postion thereby allowing water to pass only through the top spray grid 300. Additionally, shutoff valve 360 for the leg of the water input means which does not have soap or conditioner inlets is closed. Shutoff valve 360 adjacent to leg 356 of "Y" 354 is turned to an open position as is the soap regulator. Accordingly, water is directed through the soap regulator and soap from the supply reservoir 367 is drawn into the water and is evenly distributed throughout the spray tubes 320 of upper spray grid 300. Soapy water is discharged through all of top grid openings 326 over a very large spray area thereby simultaneously applying soapy water over the entire dog being showered. Following the application of soapy water, the soap input regulator 364 is turned to an off position and shutoff valves 325 are opened to provide clear rinsing water throughout all of the spray tubes 326 of upper spray grid 300 and throughout spray tubes 210 of each side grid 200. Because a large spray area of clear water is applied from above as well as from each side of the animal, the soap may be rinsed in an extremely short period of time. Following the rinsing operation, if desired, shutoff valves 325 may again be closed for the application of a conditioner through the top grid 300 by opening the conditioner regulator 366. Finally, if desired, the entire system can be purged with a maximum pressure of water by opening shutoff valve 360 adjacent to unrestricted line 362 and closing shutoff valve 360 adjacent to line 368.

From the foregoing it can be seen that the present invention provides a unique apparatus for quickly and efficiently showering a dog or other domestic animal. Because of the use of three large spray grid members, application of both soapy water and rinsing water may be accomplished in far less time than existing devices which have only limited spray area capabilities.

While I have illustrated and described the presently preferred embodiment of the invention and method of practicing the same, it is to be understood that the invention is not limited thereto and may be otherwise variously practiced within the scope of the following claims.

I claim:

1. An animal shower apparatus comprising:
 (a) a base in the form of a tub having a bottom portion and upwardly depending walls extending around a perimeter thereof, said base having spaced-apart tube receiving means provided on opposite sides of said base;
 (b) a pair of removable, independent side spray grid means, each grid means having a tubular vertical support member at each end and having plural spaced-apart longitudinally extending parallel spray tubes supported between the vertical supports, said side spray tubes interconnected to provide a single continuous passageway and each of said side spray tubes having a plurality of spray openings at spaced intervals along its length, said vertical support members adapted to be removably inserted into said tube receiving means whereby said side grid means are supported in substantially vertical planes on opposite sides of said base and said side spray tubes of each grid extend substantially horizontally, and are vertically spaced and said spray openings are oriented to direct a spray of water generally toward an opposite side grid; and
 (c) a removable, independent top spray grid means having a generally rectangular tubular frame, water input means, a plurality of interconnected longitudinally extending parallel spray tubes supported by said frame and connected to said water input means, said top spray tubes each having a plurality of spray openings at spaced intervals along its length, said top grid means also having connection means for interconnecting the top spray tubes of the top grid to the side spray tubes of the side grids, said top grid means adapted to be removably supported in a substantially horizontal plane on upper ends of said vertical support members of said side grid means by additional tube receiving means whereby said openings in said top spray tubes are oriented to direct a spray of water generally downwardly toward said base, said side grid means and said top grid means adapted to be easily assembled onto said base for use and easily disassembled for portability, said water input means further comprising separate soap and conditioner input means each in the form of a regulator device.

2. An animal shower apparatus comprising:
 (a) a base in the form of a tub having a bottom portion and upwardly depending walls extending around a perimeter thereof, said base having spaced-apart tube receiving means provided on opposite sides of said base;
 (b) a pair of side spray grid means, each grid means having a tubular vertical support member at each end and having plural spaced-apart longitudinally extending parallel spray tubes supported between the vertical supports, said side spray tubes interconected to provide a single continuous passageway and each of said side spray tubes having a plurality of spray openings at spaced intervals along its length, said vertical support members adapted to be removably inserted into said tube receiving means whereby said side grid means are supported in substantially vertical planes on opposite sides of the base and said side spray tubes of each grid extend substantially horizontally, and are vertically spaced and said spray openings are oriented to direct a spray of water generally toward an opposite side grid; and
 (c) top spray grid means having a generally rectangular tubular frame, water input means, a plurality of interconnected longitudinally extending parallel spray tubes supported by said frame and connected to said water input means, said top spray tubes each having a plurality of spray openings at spaced intervals along its length, said top grid means also having connection means for interconnecting the top spray tubes of the top grid to the side spray tubes of the side grids, said top grid means adapted to be removably supported in a substantially horizontal plane on upper ends of said vertical support members of said side grid means by additional tube receiving means whereby said openings in said top spray tubes are oriented to direct a spray of water generally downwardly toward said base, said water input means comprising a main inlet tube and a "Y" connector with each leg of said "Y" connector connected to a separate top spray tube of said top grid means.

3. An apparatus according to claim 2 wherein a soap input means is provided in one leg of said "Y" and the other leg of said "Y" is free of obstructions.

4. An apparatus according to claim 2 wherein separate shutoff valves are provided in each leg of said "Y" connector.

5. An animal shower apparatus comprising:

(a) a base in the form of a tub having a bottom portion and upwardly depending walls extending around a perimeter thereof, said base having spaced-apart tube receiving means provided on opposite sides of said base;

(b) a pair of side spray grid means, each grid means having a tubular vertical support member at each end and having plural spaced-apart longitudinally extending parallel spray tubes supported between the vertical supports, said side spray tubes interconnected to provide a single continuous passageway and each of said side spray tubes having a plurality of spray openings at spaced intervals along its length, said vertical support members adapted to be removably inserted into said tube receiving means whereby said side grid means are supported in substantially vertical planes on opposite sides of the base and said side spray tubes of each grid extending substantially horizontally, and are vertically spaced and said spray openings are oriented to direct a spray of water generally toward on opposite side grid; and (c) top spray grid means having a generally rectangular tubular frame, water input means, a plurality of interconnected longitudinally extending parallel spray tubes supported by said frame and connected to said water input means, said top spray tubes each having a plurality of spray openings at spaced intervals along its length, said top grid means also having connection means for interconnecting the top spray tubes of the top grid to the side spray tubes of the side grids, said top grid means adapted to be removably supported in a substantially horizontal plane on upper ends of said vertical support members of said side grid means by additional tube receiving means whereby said openings in said top spray tubes are oriented to direct a spray of water generally downwardly toward said base, said connection means comprising two separate hoses for independently connecting top grip spray tubes to side spray tubes of each side spray grid.

6. An apparatus according to claim 5 wherein a separate shutoff valve is provided in each hose to selectively provide water to only the top spray tubes or to both top spray tubes and side spray tubes of each side grid means.

7. An animal shower apparatus comprising:

(a) a base in the form of a tub having a bottom portion and upwardly depending walls extending around a perimeter thereof, said base having spaced-apart tube receiving means provided on opposite sides of said base;

(b) a pair of removable, independent side spray grid means, each grid means having a tubular vertical support member at each end and having plural spaced-apart longitudinally extending parallel spray tubes supported between the vertical supports, said side spray tubes interconnected to provide a single continuous passageway and each of said side spray tubes having a plurality of spray openings at spaced intervals along its length, said vertical support members adapted to be removably inserted into said tube receiving means whereby said side grid means are supported in substantially vertical planes on opposite sides of said base and said side spray tubes of each grid extend substantially horizontally, and are vertically spaced and said spray openings are oriented to direct a spray of water generally toward an opposite side grid; and (c) a removable, independent top spray grid means having a generally rectangular tubular frame, water input means, a plurality of interconnected longitudinally extending parallel spray tubes supported by said frame and connected to said water input means, said top spray tubes each having a plurality of spray openings at spaced intervals along its length, said top grid means also having connection means for interconnecting the top spray tubes of the top grid to the side spray tubes of the side grids, said top grid means adapted to be removably supported in a substantially horizontal plane on upper ends of said vertical support members of said side grid means by additional tube receiving means whereby said openings in said top spray tubes are oriented to direct a spray of water generally downwardly toward said base, said side grid means and said top grid means adapted to be easily assembled onto said base for use and easily disassembled for portability, said apparatus further comprising strap means secured to said rectangular frame of said top grid means on opposite sides thereof to aid in restraining an animal in a desired position within the shower apparatus.

* * * * *

UNITED STATES PATENT AND TRADEMARK OFFICE
CERTIFICATE OF CORRECTION

PATENT NO. : 4,741,289
DATED : May 3, 1988
INVENTOR(S) : Terry M. Blose

It is certified that error appears in the above-identified patent and that said Letters Patent is hereby corrected as shown below:

Column 2, line 55 after "portion of" add --the--.

Column 5, line 59 change "said" to --the--.

Column 7, line 19 change "extending" to --extend--.

Column 8, line 18 change "said" to --the--.

Signed and Sealed this

First Day of November, 1988

Attest:

DONALD J. QUIGG

*Attesting Officer*  *Commissioner of Patents and Trademarks*